(12) United States Patent
Balthasar et al.

(10) Patent No.: US 10,888,902 B2
(45) Date of Patent: Jan. 12, 2021

(54) CLASSIFICATION METHOD AND APPARATUS

(71) Applicant: Tomra Sorting GmbH, Mühlheim-Kärlich (DE)

(72) Inventors: Dirk Balthasar, Boppard (DE); Michael Mayer, Neuwied-Oberbieber (DE); John McGloughlin, Kildare (IE)

(73) Assignee: TOMRA SORTING GMBH, Mühlheim-Kärlich (DE)

( * ) Notice: Subject to any disclaimer, the term of this patent is extended or adjusted under 35 U.S.C. 154(b) by 0 days.

(21) Appl. No.: 16/643,244

(22) PCT Filed: Sep. 3, 2018

(86) PCT No.: PCT/EP2018/073639
§ 371 (c)(1),
(2) Date: Feb. 28, 2020

(87) PCT Pub. No.: WO2019/043231
PCT Pub. Date: Mar. 7, 2019

(65) Prior Publication Data
US 2020/0331034 A1    Oct. 22, 2020

(30) Foreign Application Priority Data
Sep. 1, 2017   (EP) ..................... 17189017

(51) Int. Cl.
*B07C 5/342*   (2006.01)
*G01N 21/89*   (2006.01)
*G01N 21/84*   (2006.01)

(52) U.S. Cl.
CPC ....... *B07C 5/3425* (2013.01); *G01N 21/8901* (2013.01); *B07C 2501/0018* (2013.01); *G01N 2021/845* (2013.01)

(58) Field of Classification Search
CPC .......... B07C 5/3425; B07C 2501/0018; G01N 21/8901
See application file for complete search history.

(56) References Cited

U.S. PATENT DOCUMENTS

| 5,692,621 A | 12/1997 | Davis et al. |
| 7,339,660 B1 * | 3/2008 | Cohn ................. B07C 5/3427 209/581 |

(Continued)

FOREIGN PATENT DOCUMENTS

| GB | 2492358 A | 1/2013 |
| WO | 2014013421 A1 | 1/2014 |
| WO | 2016141398 A1 | 9/2016 |

OTHER PUBLICATIONS

Extended European Search Report dated Mar. 8, 2018, issued by the European Patent Office in corresponding European Application No. 17189017.1-1014, (5 pages).

(Continued)

*Primary Examiner* — Terrell H Matthews
(74) *Attorney, Agent, or Firm* — Buchanan Ingersoll & Rooney P.C.

(57) ABSTRACT

A method for object classification, including: guiding a continuous stream of objects from a transport mechanism directly into an unsupported path, along which the object stream is fed through a detection region; illuminating the detection region with a radiation band in a first direction; optically scanning the detection region to detect electromagnetic radiation reflected by the at least one object in the detection region by viewing the detection region along a second direction, wherein the directions have a cross-section in the detection region and form an angle relative each other of 10°-80°; analyzing the information; and classifying objects in at least two different directions based on the analysis of the transparency information from the optical (Continued)

scanning; wherein the step of analyzing the information from the optical scanning includes analyzing the objects based on the intensity, spread and texture of the detected radiation from the optical scanning.

17 Claims, 4 Drawing Sheets

(56) References Cited

U.S. PATENT DOCUMENTS

| | | | |
|---|---|---|---|
| 10,427,190 B2 * | 10/2019 | Huber | B07C 5/3427 |
| 2015/0219570 A1 | 8/2015 | Dirix | |
| 2015/0283586 A1 * | 10/2015 | Dante | G06K 9/0063 |
| | | | 209/577 |
| 2018/0056334 A1 * | 3/2018 | Justice | B07C 5/342 |

OTHER PUBLICATIONS

International Search Report (PCT/ISA/210) dated Dec. 3, 2018, by the European Patent Office as the International Searching Authority for International Application No. PCT/EP2018/073639.

Written Opinion (PCT/ISA/237) dated Dec. 3, 2018, by the European Patent Office as the International Searching Authority for International Application No. PCT/EP2018/073639.

* cited by examiner

CLASSIFICATION METHOD AND APPARATUS

TECHNICAL FIELD OF THE INVENTION

The invention relates to the field of object classification. More precisely, the invention relates to a method and an apparatus for off-belt object classification.

BACKGROUND OF THE INVENTION

Machines for inspection and sorting of bulk objects supplied in a continuous stream typically comprise a feed unit, an optical system and an analysis unit. The feed unit supplies a stream of objects which are to be inspected continuously through a detection region that is scanned by the optical system, which is in operational communication with the analysis unit. The analysis unit analyzes each separate object in the object stream for one or more preselected properties, such as color, shape and/or texture or any combination thereof. Based on this analysis, the analysis unit can examine whether the inspected object satisfies specific criteria in terms of the observed property, resulting in a classification.

A requirement for such inspection and sorting apparatuses based on an optical sensor and an analysis device is that a correct distinction can be made between optical information coming from the inspected objects and optical information coming from the background.

WO 2014/013421 describes an apparatus for inspection of objects, provided with a transport mechanism, for instance a conveyor belt or a chute, configured to transport a continuous stream of objects so that, on leaving the transport mechanism, the object stream follows a free-fall path along which it is fed in a single object layer through a detection region, a radiation source configured to illuminate the detection region, a detection unit, configured to optically scan the illuminated detection region, an analysis unit and possibly a removal unit and also a background element, which is situated behind the falling object stream, seen from the position of the detection unit, positioned so that electromagnetic radiation beams from the radiation source impinge on an illumination zone of the background element when these beams do not impinge on an object from the object stream, the detection unit can only receive an image of a detection zone of the background element, characterized in that the background element is mounted so that the illumination zone and the detection zone are separated from each other.

The apparatus provides a solution for detection of products in a product stream without false detection of products from electromagnetic radiation reflected by the background, however it does not provide sorting of products based on optical characteristics and is not optimal for detecting dark products in the product stream.

SUMMARY OF THE INVENTION

It is an object of the invention to provide an improved solution for off-belt object classification of transparent objects in a product stream.

According to a first aspect of the invention, this and other objects are achieved by a method for object classification, the method comprising the steps of: guiding a continuous stream of objects from a transport mechanism directly into an unsupported path, along which the object stream is fed through a detection region; emitting electromagnetic radiation along a first direction for illuminating said detection region, which emitted electromagnetic radiation forms a radiation band extending in a direction orthogonal to said first direction; optically scanning the detection region to detect electromagnetic radiation reflected by the at least one object in the detection region by viewing the detection region along a second direction, wherein the first direction and the second direction have a cross-section in the detection region and forms an angle relative each other within the range of 3°-80° or 10°-80°; analyzing the information from the optical scanning; and classifying objects from the object stream based on the analysis of the transparency information or the reflection information from the optical scanning; wherein the step of analyzing the information from the optical scanning comprises analyzing the objects based on the intensity, spread and optionally texture of the detected radiation from the optical scanning, and wherein the step of analyzing the information from the optical scanning comprises comparing the information to information in a lookup table and/or comparing the information to one or more thresholds.

According to one embodiment, said step of classifying said objects further comprises sorting the objects from the object stream in at least two different direction based on the analysis of the reflection information from the optical scanning and/or based on classification data.

According to one embodiment, said step of analyzing the information from the optical scanning further comprises comparing electromagnetic radiation from the illumination that is directly reflected by the at least one object in the object stream to information in a lookup table and/or to one or more thresholds to determine transparency or reflection information of said at least one object.

According to one embodiment, said step of analyzing the information from the optical scanning further comprises comparing intensity and spread of electromagnetic radiation from the illumination that is directly reflected by the at least one object in the object stream to information in a lookup table and/or to one or more thresholds to determine transparency or reflection information of said at least one object.

According to a second aspect of the invention there is provided a method for object sorting, the method comprising the steps of: guiding a continuous stream of objects from a transport mechanism directly into an unsupported path, along which the object stream is fed through a detection region; emitting electromagnetic radiation along a first direction for illuminating said detection region, which emitted electromagnetic radiation forms a radiation band extending in a direction orthogonal to said first direction; optically scanning the detection region to detect electromagnetic radiation reflected by the at least one object in the detection region by viewing the detection region along a second direction, wherein the first direction and the second direction have a cross-section in the detection region and forms an angle relative each other within the range of 3°-80° or 10°-80°; analyzing the information from the optical scanning; and sorting objects from the object stream in at least two different directions based on the analysis of the transparency information or reflection information from the optical scanning; wherein the step of analyzing the information from the optical scanning comprises analyzing the objects based on the intensity, spread and optionally texture of the detected radiation from the optical scanning.

The below information, features and embodiments relate to both the first and second aspect of the invention.

In relation to the invention the radiation source is a line illumination, i.e. the illumination forms a radiation band or a line when falling upon a flat surface which radiation band may be captured and viewed at least via an image sensor. Further, the emitted electromagnetic radiation forms a radiation band when falling upon a flat surface which radiation band may be captured and viewed at least via an image sensor. The illumination may be collimated or focused.

According to one example the measuring system comprises of a radiation source and a detector, preferably focused on the object plane. The detector measurement plane and the line illumination are disjoint and have a cross-section in the object plane. This means that if no object is present in the system, an extremely low radiation is detected by the detector, since the illumination line and the detection line do not intersect in the void space.

The step of analyzing the information from the optical scanning may further comprise determining transparency information by comparing electromagnetic radiation from the illumination that is directly reflected by the at least one object in the object stream to a first threshold to determine that there is material present in the detection region, and thereafter comparing electromagnetic radiation from the illumination that is directly reflected by the at least one object to a second threshold to determine if the present material is transparent and/or reflective, wherein the second threshold lies above the first threshold, and thereafter setting the transparency information.

By using threshold levels to evaluate whether objects are present in the detection region and determining a probability of the object being transparent an efficient classification and/or sorting of objects in for instance glass detection applications and other applications for classification and/or sorting of transparent objects can be achieved.

In relation to this invention, the term classification data refers to the data obtained in, or resulting from, the step of classifying objects in the object stream. One example of classification data is a specific class, like acceptable/non-acceptable; or a classification value within a certain range (e.g. class A is x1 to x2; class B is x2 to x3, where xi is a number), which classification value may be formed based on one single or a combination of measured parameter values. Another example of classification data is the classification value (formed based on one single or a combination of measured parameter values); the classification value may be a single value or an array of values.

According to one embodiment, the classification data (i.e. the data obtained in, or resulting from, the step of classifying objects in the object stream) is used for sorting individual objects of a product stream in at least two different directions, additionally or alternatively the classification data can be used in the same apparatus or transferred to another device in order to perform various operations, such as sorting in later stages, as well as for statistical analysis. In other words, individual classification data may be assigned to individual objects and keep being linked to this object through various steps in the material handling process, and is optionally used at one or more stations in the material handling process. Additionally, or alternatively, individual or bulks of classification data may be processed for statistical purposes in the same machine where it was determined, or in another device to which it has been provided e.g. by wire or wirelessly.

Additionally or alternatively, the step analyzing the information from the optical scanning further includes classifying to which degree said material is transparent. Additionally or alternatively, the step analyzing the information from the optical scanning further includes classifying to which degree said material is reflective. The step of analyzing the information from the optical scanning may further comprise comparing directly reflected to a third threshold to determine a probability of the present material being transparent.

The step of analyzing the information from the optical scanning may further comprise determining the height, and/or height profiles of objects in the object stream.

The step of analyzing the information from the optical scanning may comprise comparing the information to information in a lookup table (LUT) and/or comparing the information to thresholds. The lookup tables maybe a one-dimensional lookup table or a two-dimensional lookup table or a N-dimensional lookup table. By dimension here it is meant that the lookup table evaluates a sampled representation of a e.g. N variables. The one-dimensional lookup table returns an output in response to only one input parameter, the input parameter being e.g. the intensity or the spread of the detected radiation; i.e. one output is returned for LUT (Intensity) and one output is returned for LUT (Spread). The two-dimensional lookup table on the other hand returns an output in response to two input parameters, e.g. the intensity and the spread of the detected radiation, one output is returned for LUT (Intensity, Spread).

Alternatively, step of analyzing the information from the optical scanning may comprise the use of deep learning or support vector machines.

The method may further comprise a step of optically scanning a zone on a background element where the line illumination hits the background element, wherein the step of analyzing the information from the optical scanning comprises determining whether material is present in the detection region based on the information from the optical scanning of the zone on the background.

Optically scanning the zone on the background element enables for detection of a line illumination reflection on the background element, which enables determination of whether there is an object present in the detection region based on the reflection from the background element, thus enabling to detect and sort even very dark objects in the object stream as well as to distinguish optically dark objects from optically transparent objects.

The steps of optically scanning the zone on the background element and optically scanning the detection region may be performed simultaneously with one camera.

Using one camera with a field of view that covers both the detection region and the zone on the background element where the laser line impinges the background element is a cost-effective solution that also simplifies the analysis of the information from the scanning.

The step of illuminating the detection region may be done with a plurality of line illuminations for a plurality of detection regions and the step of optically scanning the detection region is done in a plurality of measurement lines for the detection regions. The step of analyzing the information from the optical scanning may then comprise determining the motion of the objects in the object stream.

By determining the trajectory of the objects in the object stream more precise ejection of the object may be performed, and a better overall classification and/or sorting can be achieved.

The plurality of line illuminations may have different wavelengths, wherein the step of analyzing the information from the optical scanning comprises determining optical properties and physical properties of the objects in the object stream.

Alternatively or additionally, the plurality of line illuminations may have different polarizations. This may be beneficial for removing background radiation.

According to a third aspect of the invention, there is provided an apparatus for object classification and/or sorting, the apparatus comprising: a transport mechanism arranged to transport an object stream so that the object stream, after leaving the transport mechanism, follows an unsupported path, along which it is fed through a detection region; a radiation source being configured to emit a radiation band in a first direction for illuminating the detection region; a detection unit arranged to view the detection region along a second direction and to detect electromagnetic radiation reflected by the at least one object in the detection region; wherein the first direction and the second direction have a cross-section in the detection region and forms an angle relative each other within the range of 10°-80°; an analysis unit in operational connection with the detection unit and arranged to determine transparency information by comparing electromagnetic radiation from the illumination that is directly reflected by the at least one object in the object stream to a lookup table or to one or more thresholds to determine that there is material present in the detection region, and thereafter comparing electromagnetic radiation from the illumination that is directly reflected by the at least one object to a second threshold to determine if the present material is transparent, wherein the second threshold According to a fourth aspect of the invention, there is provided an apparatus for object classification and/or sorting, the apparatus comprising: a transport mechanism arranged to transport an object stream so that the object stream, after leaving the transport mechanism, follows an unsupported path, along which it is fed through a detection region; a radiation source being configured to emit a radiation band in a first direction for illuminating the detection region; a detection unit arranged to view the detection region along a second direction and to detect electromagnetic radiation reflected by the at least one object in the detection region; wherein the first direction and the second direction have a cross-section in the detection region and forms an angle relative each other within the range of 3°-80° or 10°-80°; an analysis unit in operational connection with the detection unit and arranged to determine transparency and/or reflection information by comparing electromagnetic radiation from the illumination that is directly reflected by the at least one object in the object stream to at least one threshold or look-up table to determine if the material present in the detection region is transparent and thereafter setting the transparency or reflection information.

The detection unit may be further configured to sense electromagnetic radiation reflected by a point on a background element where the electromagnetic radiation from the radiation source impinges the background element.

The apparatus may comprise a plurality of radiation sources configured to illuminate objects in the object stream in a plurality of positions along the unsupported path.

The apparatus may further comprise a removal unit configured to remove objects from the object stream, wherein the removal of objects is based on the analysis in the analysis unit.

According to at least one embodiment the analysis unit is further arranged to determine transparency information by comparing electromagnetic radiation from the illumination that is directly reflected by the at least one object in the object stream to a first threshold or look-up table to determine that there is material present in the detection region, and thereafter comparing electromagnetic radiation from the illumination that is directly reflected by said at least one object to a second threshold or a second look-up table to determine if the present material is transparent, wherein the second threshold optionally lies above the first threshold, and thereafter setting the transparency information.

It is noted that the invention relates to all possible combinations of features in the claims.

BRIEF DESCRIPTION OF THE DRAWINGS

The present invention will be described in more detail with reference to the appended drawings, showing currently preferred embodiments of the invention.

As illustrated in the figures, the sizes of layers and regions may be exaggerated for illustrative purposes and, thus, may be provided to illustrate the general structures of embodiments of the present invention. Like reference numerals refer to like elements throughout.

DETAILED DESCRIPTION OF THE INVENTION

Figure 1:
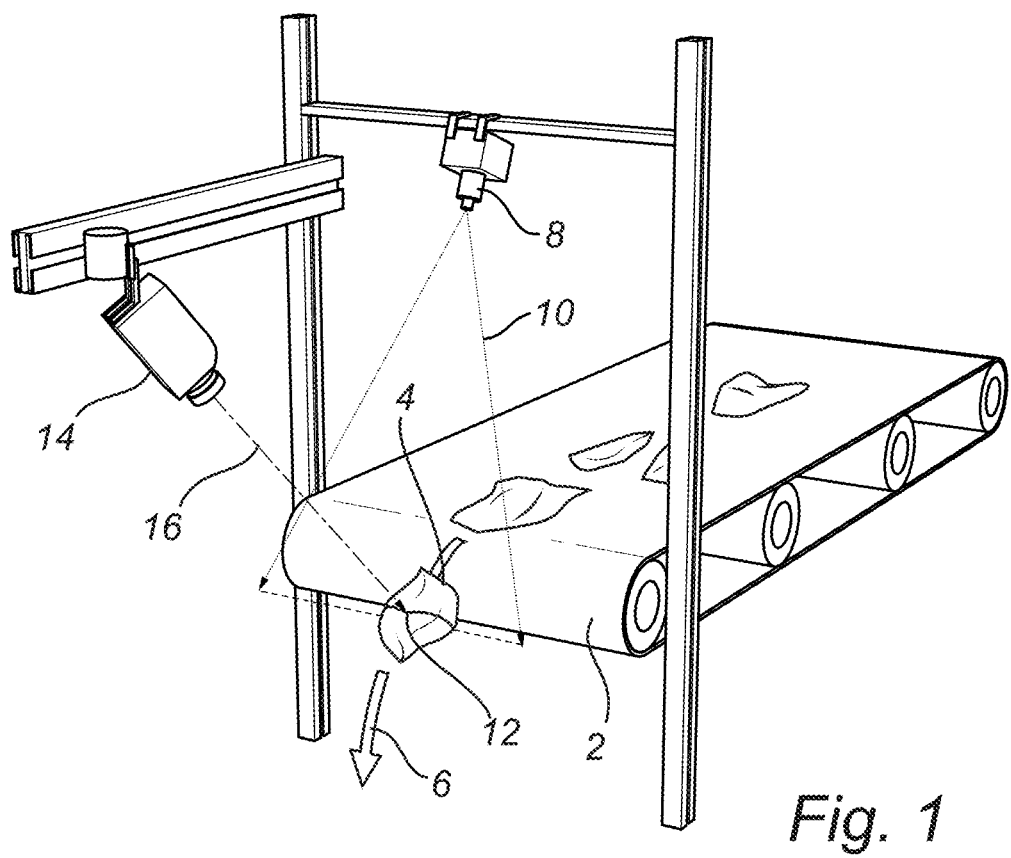
FIG. 1 is a schematic perspective view of an apparatus according to an embodiment of the invention.

FIG. 1 shows an apparatus for inspection of objects in an object stream according to an embodiment of the invention. A conveyor belt 2 guides an object stream 4 into an unsupported path, here a free-fall path 6. Although a conveyor belt 2 is here used for guiding the object stream 4 to the free-fall path 6, any type of transport mechanism, such as chutes or similar, can be used according to the invention. A radiation source, here a line laser 8, illuminates a laser line 10 in a first direction 10 through a detection region 12. Although a laser line is here used, any type of radiation source which uses focused electromagnetic radiation can be used according to the invention. The detection region 12 is a region through which the objects travel after having left the conveyor belt 2, when being in a free-fall path 6. The laser line 10 may be of substantially equal width as the conveyor belt 2 from which the object stream 4 is guided into the free-fall path 6, to ensure that all objects in the object stream 4 travel through the detection region 12. A detector, here a camera 14, detects radiation in a measurement plane 16 that intersects the laser line in the detection region 12. The measurement plane 16 may be of substantially equal width as the laser line 10.

The first direction 10 and the second direction 16 are disjoint and have a cross-section in the detection region 12. The detection region 12 is off-belt and at a position where the object stream 4 discharged from the conveyor belt 2 is in a free-fall path 6. If there is no object present in the detection region 12 the laser line will impinge a part of a background element that is not detected by the part of the measurement plane that travel through the detection region. Hence, there will be no reflected electromagnetic radiation detected if no object is present, which enables for distinct recognition whether there is an object present in the detection region.

The angle between the first direction 10 and the second direction 16 is preferable within the range of 3°-80°, more preferably within the range of 5°-60°, more preferably within the range of 8°-40°, more preferably within the range of 10°-35°, more preferably within the range of 15°-30°, most preferably within the range of 20°-25°.

The wavelength of the emitted electromagnetic radiation is preferably within the range of 300 nm-2000 nm, more preferably within the range of 400 nm-700 nm.

Figure 5:
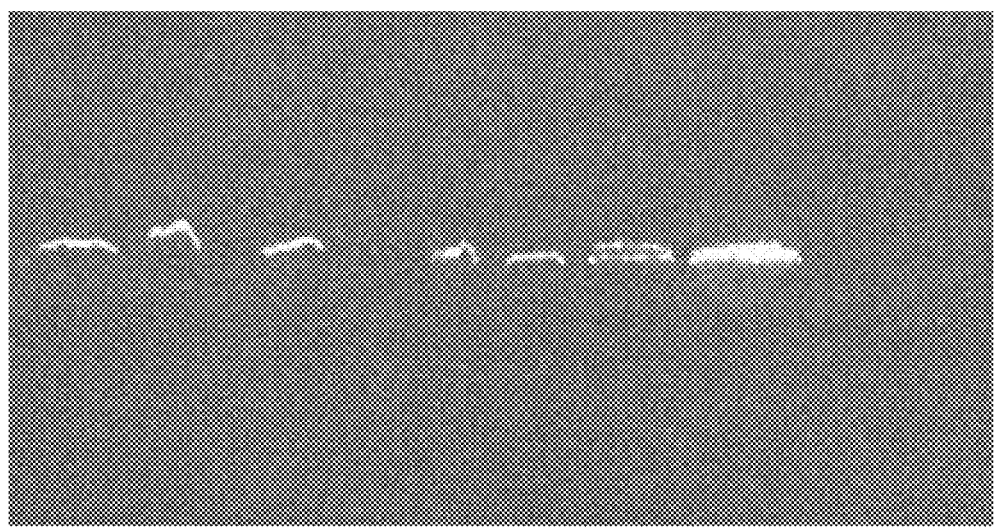
FIG. 5 is a plot of the electromagnetic radiation detected by a detector in an apparatus according to an embodiment of the invention.

Determination of material properties of the objects in the object stream is done based on the directly reflected electromagnetic radiation at the surface of the objects, the diffusely reflected electromagnetic radiation from the objects and/or the height of the objects. Thresholds can be used to determine optical properties of the objects. Referring to FIG. 5, the directly reflected electromagnetic radiation can be seen as the intensity at the maximum in y-direction, the diffusely reflected electromagnetic radiation can be seen as the line width around the maximum in y-direction and the height can be seen as the maximum in y-direction. Determination of the height is beneficial when it comes to calculation of the trajectory of the objects in the object stream.

The analysis of information from the optical scanning may also comprise identifying and analyzing several surfaces of transparent objects in the object stream, based on double surfaces as seen in FIG. 5.

According to one embodiment of the invention, determination of the transparency of the objects in the object stream is achieved by comparing the directly reflected electromagnetic radiation to threshold values. A first threshold value is then used to determine if an object is present if the directly reflected electromagnetic radiation exceeds the first threshold value. A second threshold value, higher than the first threshold value, is then used to determine that the object is transparent if the directly reflected electromagnetic radiation does not exceed the second threshold value. Several such thresholds can be applied to determine probabilities of the object being transparent. Combinations of thresholds for the different parameters, that is the directly reflected electromagnetic radiation at the surface of the objects, the diffusely reflected electromagnetic radiation from the objects and/or the height of the objects, to determine various optical properties of the objects can be applied.

Alternatively, or additionally to the threshold determination, lookup tables, deep learning and/or support vector machines can be used to determine properties of the objects.

In order to remove ambient electromagnetic radiation in the analysis of the detected electromagnetic radiation, a frame with the laser on and a frame with the laser of may be recorded. A background subtraction is then performed in the analysis to get rid of the ambient electromagnetic radiation. Pulsing of the laser using a beam splitter may also be used for this purpose.

The apparatus may further comprise a removal unit, such as an air blower, configured to remove objects that are rejected in the analysis and thus sort objects based on the analysis.

The apparatus may additionally include a bandpass filter on the detector, polarized electromagnetic radiation or polarization filter in front of the detector.

The apparatus may also be using a scanned 3D detection with polygon mirror or can be used in combinations with other detectors.

Figure 2:
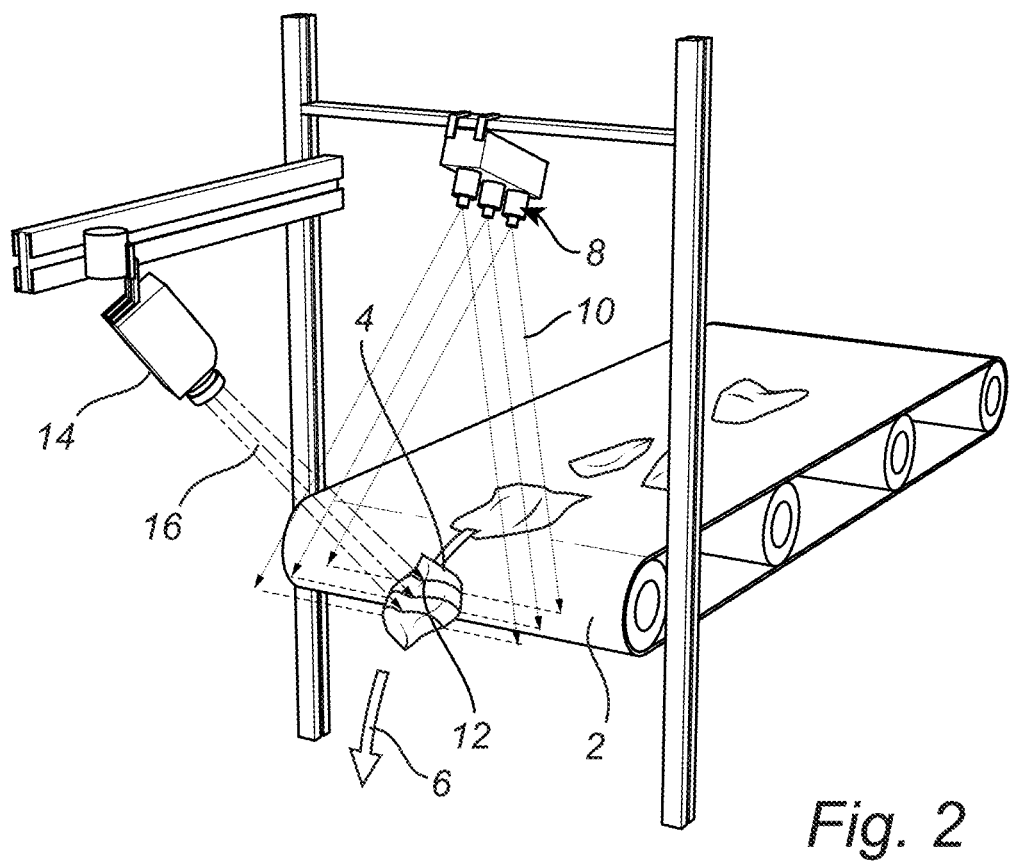
FIG. 2 is a schematic view of an apparatus according to another embodiment of the invention, comprising three line illuminations.

FIG. 2 shows an apparatus similar to that in FIG. 1 but comprising a plurality of parallel line illuminations 8, set up to create a plurality of parallel laser lines. This enables for one, as in this case, or several cameras 14 to detect reflected electromagnetic radiation from the plurality of parallel line laser lines in a plurality of detection regions 12 at different positions in the free-fall path 6 of the object stream 4. In this way, the positions of the objects in the different detection regions 12 can be determined, to determine a motion, or trajectory, of the objects in the object stream 4.

In sorting systems, the object speed and moving direction is normally assumed to be constant in-between detection and ejection and if objects move with non-constant speed, there is a risk for unprecise removal of rejected objects. In some situations, the ejection window is increased in order to compensate the variation in movement. This leads to a stable ejection, but also an increase of unwanted removal of objects from the object stream 4.

An alternative to all of the detection zones being in the free-fall path of the object stream is that one or more of them being in the object stream on the conveyor belt, prior to being in a free-fall path.

The minimum distance between detection and ejection is determined by pixel size and latency. For systems with big pixel sizes the minimum distance between detection and ejection can be quite large. If two detectors are combined, the movement of objects reduces the performance of convergence algorithms and thus also the ejection performance. By determining the trajectory of the objects in the object stream more precise ejection of the object may be performed, and a better overall sorting can be achieved.

Alternatively, or complementary to using the classification data for sorting as described above, the data from the classification step can be used in the same apparatus or transferred to another device in order to do various operations, such as sorting, in later stages, as well as for statistical analysis.

Figure 6:
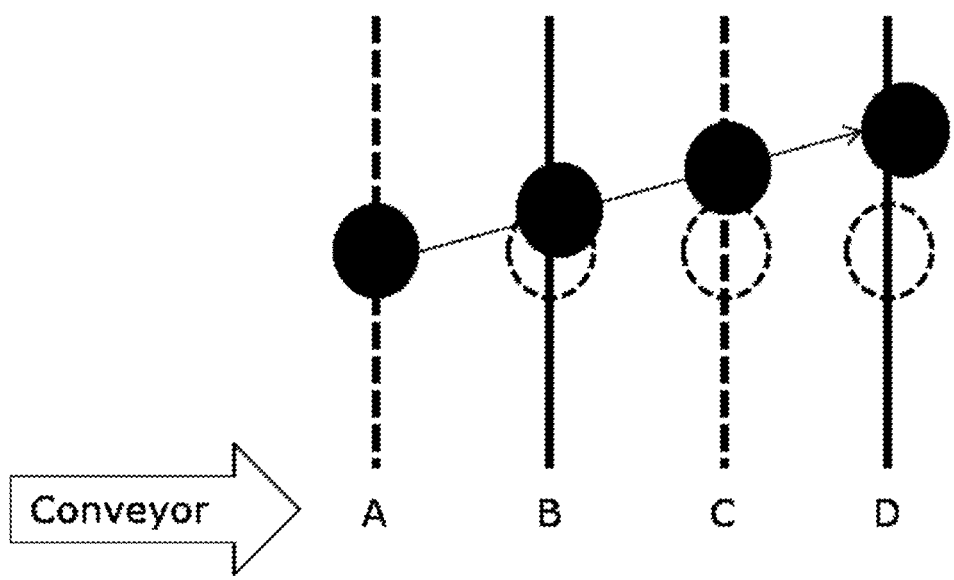
FIG. 6 is a schematic view of determination of the trajectory of an object in the object stream, which can be used with the apparatus of FIG. 2.

FIG. 6 shows a motion estimation of an object performed by an apparatus according to FIG. 2. Two high resolution detectors A, C are responsible for movement estimation of the object while a low resolution detector B is responsible for material classification of the object. The detected objects of the first high resolution detector A are searched and mapped to correspondent objects in the second high resolution detector C. Based on the correspondent positions of the object in the first and the second high resolution detector A, C the position of the object is interpolated for the low resolution detector B and for a blow bar D. The sensor data of the low resolution detector B is combined into the interpolated image position. The blow bar D uses an interpolated position for ejection. The position of the first and second high resolution detectors A, C is disjoint, while the low resolution detector B can be mounted everywhere. The interpolated position reduces error for ejection and convergence for rolling objects.

The apparatus may also comprise several lasers of different wavelength, which enables for determination of further optical properties such as the color of the objects and analysis of other parameters based on spectroscopy. Lasers at different positions, such as in FIG. 2, can be used for this purpose, but also multiple pulsed lasers at the same optical plane is a possibility.

The apparatus may also combine different laser polarizations to filter portions of the reflected electromagnetic radiation and more easily distinguish properties of the objects in the object stream. The apparatus may for instance comprise several lasers with different polarizations or a polarization camera.

Figure 3:
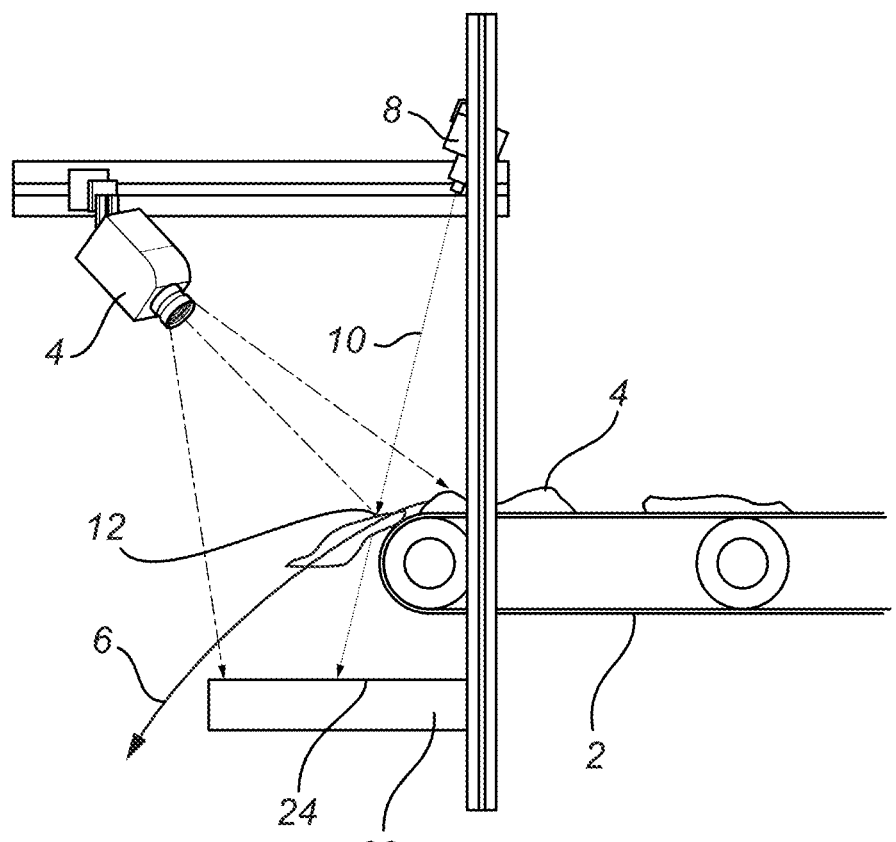
FIG. 3 is a schematic perspective view of an apparatus according to another embodiment of the invention, comprising line illumination detection.

FIG. 3 shows an apparatus for object inspection similar to that in FIG. 1. However, the apparatus has in this embodiment a camera 14 that detects radiation in an area that covers both the detection region 12 and a zone 22 where the line illumination impinges a background element 24. This enables for the camera 14 to detect a line illumination reflection on the background element 24, which enables determination of whether there is an object present in the detection region 12 based on the reflection from the background element 24. This is helpful when it comes to detecting objects that exhibit very low reflection levels. A single camera 14 here covers both the detection region 12 and the zone 22 on the background element 24, however two different detectors can also be used for these purposes according to the invention.

Figure 7:
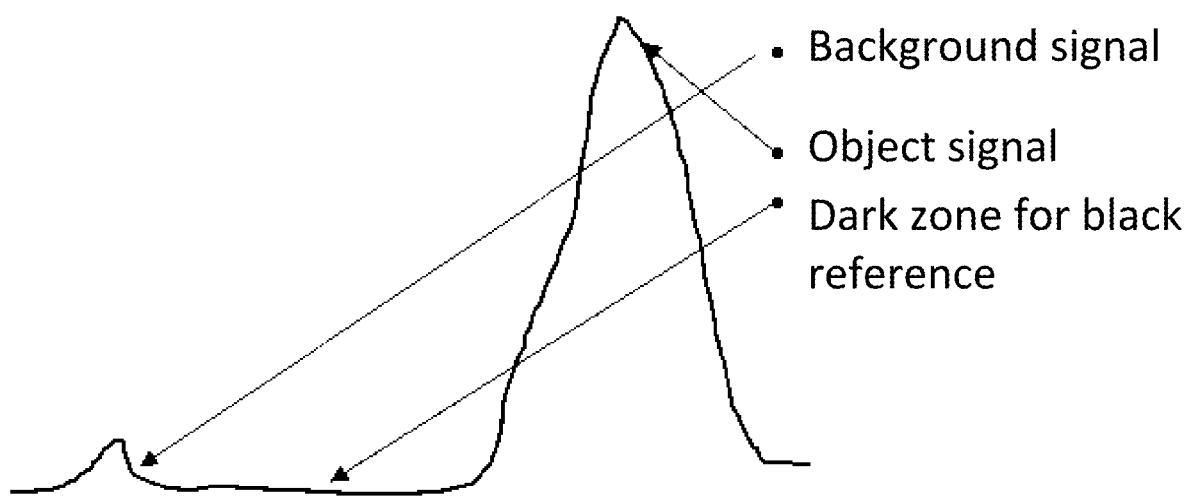
FIG. 7 is a schematic view of a cross-section of the electromagnetic radiation detected by a detector in an apparatus according to FIG. 3.

FIG. 7 shows a schematic view of the electromagnetic radiation detected by the detector in the apparatus of FIG. 3. The object signal will be present when there is an object in the detection region that reflects the electromagnetic radiation emitted by the laser line, while the background signal can further be used to determine if there is a very dark, that is essentially non-reflective, object in the detection region. The background signal, being the electromagnetic radiation emitted by the laser line and reflected by the background element, can also be used as a way of calibrating the laser line against the dark zone for background reference.

The laser line reflected by the background element can also be used to determine if an object in the object stream is transparent, since a transparent object will give rise to transmission of part of the emitted electromagnetic radiation while an opaque object will not enable any transmission of the emitted electromagnetic radiation.

Figure 4:
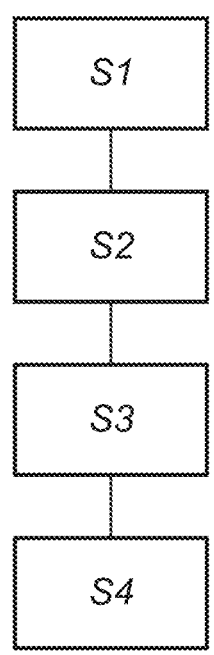
FIG. 4 is a flow chart of the method according to an embodiment of the invention.

FIG. 4 is a flow chart of a method for inspection of objects, comprising the steps of: guiding S1 a continuous stream of objects 4 into a free-fall path 6, along which the object stream 4 is fed in a single object layer through a detection region 12; illuminating S2 the detection region 12 in an first direction 10; optically scanning S3 the detection region 12 in a second direction 16; and analyzing S4 the information from the optical scanning; wherein the measurement plane 12 and the first direction 10 are disjoint and have a cross-section in the detection region 12.

Possible applications for the method and apparatus range over, but are not limited to, classification and/or sorting of glass, foil, napkins, printed circuit boards, cartridges, mining material, as well as quality analysis of food with regards to size and detection of cracks or foreign material. It can also be used to identify polymers in a waste stream.

The person skilled in the art realizes that the present invention by no means is limited to the embodiments described above. On the contrary, many modifications and variations are possible within the scope of the appended claims. For example, the radiation source and detector can be arranged in any direction that still allows for the method to be carried out according to the invention.

Additionally, variations to the disclosed embodiments can be understood and affected by the skilled person in practicing the claimed invention, from a study of the drawings, the disclosure and the appended claims. In the claims, the word "comprising" does not exclude other elements or steps, and the indefinite article "a" or "an" does not exclude a plurality.

ITEMIZED LIST OF EXEMPLIFYING EMBODIMENTS

IEE1. A method for object classification, the method comprising the steps of:
 guiding a continuous stream of objects from a transport mechanism directly into an unsupported path, along which said object stream is fed through a detection region;
 emitting electromagnetic radiation along a first direction for illuminating said detection region, which emitted electromagnetic radiation forms a radiation band extending in a direction orthogonal to said first direction;
 optically scanning said detection region to detect electromagnetic radiation reflected by the at least one object in the detection region by viewing said detection region along a second direction,
 wherein the first direction and the second direction have a cross-section in the detection region and forms an angle relative each other within the range of 3°-80°;
 analyzing the information from the optical scanning; and
 classifying objects from the object stream based on the analysis of the reflection information from the optical scanning;
 wherein the step of analyzing the information from the optical scanning comprises analyzing the objects based on the intensity and spread of the detected radiation from the optical scanning.

IEE2. The method according to IEE1, wherein said step of classifying said object further comprising sorting the objects from the object stream in at least two different directions based on the analysis of the reflection information from the optical scanning.

IEE3. The method according to any of the preceding IEEs, wherein the step of analyzing the information from the optical scanning comprises determining reflection information by comparing electromagnetic radiation from the illumination that is directly reflected by the at least one object in the object stream to a first threshold, and thereafter comparing electromagnetic radiation from the illumination that is directly reflected by said at least one object to a second threshold to determine transparency of said at least one object, wherein the second threshold lies above the first threshold, and thereafter setting the reflection information.

IEE4. The method according to any of the preceding IEEs, wherein the step of analyzing the information from the optical scanning further comprises determining height profiles of objects in the object stream.

IEE5. The method according to any of the preceding IEEs, wherein the step of analyzing the information from the optical scanning comprises comparing the information to information in a lookup table and/or comparing the information to thresholds.

IEE6. The method according to any of the preceding IEEs, wherein the step of analyzing the information from the optical scanning comprises the use of deep learning or support vector machines.

IEE7. The method according to any of the preceding IEEs, further comprising a step of optically scanning a zone on a background element where the line illumination hits said background element, wherein the step of analyzing the information from the optical scanning comprises determining whether material is present in the detection region based on the information from the optical scanning of the zone on the background.

IEE8. The method according to IEE 7, wherein the steps of optically scanning the zone on the background element and optically scanning the detection region are performed simultaneously with one camera.

IEE9. The method according to any of the preceding IEEs, where the step of illuminating said detection region with electromagnetic radiation is done with a plurality of line illuminations for a plurality of detection regions and the step of optically scanning said detection region is done in a plurality of measurement lines for said detection regions.

IEE10. The method according to IEE 9, wherein the step of analyzing the information from the optical scanning comprises determining the motion of the objects in the object stream.

IEE11. The method according to IEEs 9 or 10, wherein the plurality of line illuminations have different wavelengths, wherein the step of analyzing the information from the optical scanning comprises determining optical properties and physical properties of the objects in the object stream.

IEE12. The method according to any of IEEs 9-11, wherein the plurality of line illuminations have different polarizations.

IEE13. An apparatus for object classification, the apparatus comprising:
  a transport mechanism arranged to transport an object stream so that said object stream, after leaving the transport mechanism, follows an unsupported path, along which it is fed through a detection region;
  a radiation source being configured to emit electromagnetic radiation in a first direction for illuminating the detection region, which radiation source is configured to generate a line illumination;
  a detection unit arranged to view said detection region along a second direction and to detect electromagnetic radiation reflected by the at least one object in the detection region,
  wherein the first direction and the second direction have a cross-section in the detection region and forms an angle relative each other within the range of 10°-80°;
  an analysis unit in operational connection with the detection unit and arranged to determine transparency information by comparing electromagnetic radiation from the illumination that is directly reflected by the at least one object in the object stream to a first threshold to determine that there is material present in the detection region, and thereafter comparing electromagnetic radiation from the illumination that is directly reflected by said at least one object to a second threshold to determine if the present material is transparent, wherein the second threshold lies above the first threshold, and thereafter setting the transparency information; and
  a removal unit configured to remove objects from the object stream (4), wherein said removal of objects is based on the analysis in the analysis unit.

IEE14. The apparatus according to IEE 13, wherein the detection unit is further configured to sense electromagnetic radiation reflected by a point on a background element where the electromagnetic radiation from the radiation source impinges said background element.

IEE15. The apparatus according to IEE 13, comprising a plurality of radiation sources configured to illuminate objects in the object stream in a plurality of positions along the unsupported path.

The invention claimed is:

1. A method for object classification, the method comprising the steps of:
  guiding a continuous stream of objects from a transport mechanism directly into an unsupported path, along which said object stream is fed through a detection region;
  emitting electromagnetic radiation along a first direction for illuminating said detection region, which emitted electromagnetic radiation forms a radiation band extending in a direction orthogonal to said first direction;
  optically scanning said detection region to detect electromagnetic radiation reflected by the at least one object in the detection region by viewing said detection region along a second direction,
  wherein the first direction and the second direction have a cross-section in the detection region and forms an angle relative each other within the range of 3°-80°;
  analyzing the information from the optical scanning; and
  classifying objects from the object stream based on the analysis of the reflection information from the optical scanning;
  wherein the step of analyzing the information from the optical scanning comprises analyzing the objects based on the intensity and spread of the detected radiation from the optical scanning and wherein the step of analyzing the information from the optical scanning comprises comparing the information to information in a lookup table and/or comparing the information to thresholds.

2. The method according to claim 1, wherein said step of classifying said object further comprising sorting the objects from the object stream in at least two different directions based on the analysis of the reflection information from the optical scanning.

3. The method according to claim 1, wherein the step of analyzing the information from the optical scanning further comprises comparing the electromagnetic radiation from the illumination that is directly reflected by the at least one object in the object stream to information in a lookup table and/or to one or more thresholds to determine transparency or reflection information of said at least one object.

4. The method according to claim 1, wherein the step of analyzing the information from the optical scanning comprises determining reflection information by comparing electromagnetic radiation from the illumination that is directly reflected by the at least one object in the object stream to a first threshold, and thereafter comparing electromagnetic radiation from the illumination that is directly reflected by said at least one object to a second threshold to determine transparency of said at least one object, wherein the second threshold lies above the first threshold, and thereafter setting the reflection information.

5. The method according to claim 1, wherein the step of analyzing the information from the optical scanning further comprises determining height profiles of objects in the object stream.

6. The method according to claim 1, wherein the lookup table is a one-, two- or N-dimensional lookup table.

7. The method according to claim 1, wherein the step of analyzing the information from the optical scanning comprises the use of deep learning or support vector machines.

8. The method according to claim 1, further comprising a step of optically scanning a zone on a background element where the line illumination hits said background element, wherein the step of analyzing the information from the optical scanning comprises determining whether material is present in the detection region based on the information from the optical scanning of the zone on the background.

9. The method according to claim 8, wherein the steps of optically scanning the zone on the background element and optically scanning the detection region are performed simultaneously with one camera.

10. The method according to claim 1, where the step of illuminating said detection region with electromagnetic radiation is done with a plurality of line illuminations for a plurality of detection regions and the step of optically scanning said detection region is done in a plurality of measurement lines for said detection regions.

11. The method according to claim 9, wherein the step of analyzing the information from the optical scanning comprises determining the motion of the objects in the object stream.

12. The method according to claim 9, wherein the plurality of line illuminations have different wavelengths, wherein the step of analyzing the information from the optical scanning comprises determining optical properties and physical properties of the objects in the object stream.

13. The method according to claim 9, wherein the plurality of line illuminations have different polarizations.

14. An apparatus for object classification, the apparatus comprising:
- a transport mechanism arranged to transport an object stream so that said object stream, after leaving the transport mechanism, follows an unsupported path, along which it is fed through a detection region;
- a radiation source being configured to emit electromagnetic radiation in a first direction for illuminating the detection region, which radiation source is configured to generate a line illumination;
- a detection unit arranged to view said detection region along a second direction and to detect electromagnetic radiation reflected by the at least one object in the detection region,
- wherein the first direction and the second direction have a cross-section in the detection region and forms an angle relative each other within the range of 3°-80° or 10°-80°;
- an analysis unit in operational connection with the detection unit and arranged to determine transparency or reflection information by comparing electromagnetic radiation from the illumination that is directly reflected by the at least one object in the object stream to at least one threshold or look-up table to determine if the material present in the detection region is transparent and thereafter setting the transparency or reflection information; and
- a removal unit configured to remove objects from the object stream, wherein said removal of objects is based on the analysis in the analysis unit.

15. The apparatus according to claim 14, wherein analysis unit is further arranged to determine transparency information by comparing electromagnetic radiation from the illumination that is directly reflected by the at least one object in the object stream to a first threshold or look-up table to determine that there is material present in the detection region, and thereafter comparing electromagnetic radiation from the illumination that is directly reflected by said at least one object to a second threshold or a second look-up table to determine if the present material is transparent, wherein the second threshold lies above the first threshold, and thereafter setting the transparency information.

16. The apparatus according to claim 15, wherein the detection unit is further configured to sense electromagnetic radiation reflected by a point on a background element where the electromagnetic radiation from the radiation source impinges said background element.

17. The apparatus according to claim 14, comprising a plurality of radiation sources configured to illuminate objects in the object stream in a plurality of positions along the unsupported path.

* * * * *